(12) United States Patent
Moribe

(10) Patent No.: US 8,391,624 B2
(45) Date of Patent: Mar. 5, 2013

(54) APPARATUS AND METHOD FOR QUANTIZING IMAGE DATA

(75) Inventor: Shoei Moribe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 12/965,234

(22) Filed: Dec. 10, 2010

(65) Prior Publication Data

US 2011/0164829 A1 Jul. 7, 2011

(30) Foreign Application Priority Data

Jan. 6, 2010 (JP) ................................ 2010-001571

(51) Int. Cl.
*G06K 9/38* (2006.01)
*H04N 1/405* (2006.01)

(52) U.S. Cl. ....................................... 382/252; 358/3.03

(58) Field of Classification Search .................. 382/252; 358/1.9, 3.03–3.05

See application file for complete search history.

(56) References Cited

U.S. PATENT DOCUMENTS

| 5,553,166 | A | 9/1996 | Kakutani | 382/252 |
| 2002/0080377 | A1* | 6/2002 | Tonami et al. | 358/1.9 |
| 2002/0196484 | A1* | 12/2002 | Chang | 358/534 |
| 2003/0169455 | A1* | 9/2003 | Takahashi et al. | 358/3.03 |
| 2004/0109204 | A1* | 6/2004 | Kato et al. | 358/3.05 |
| 2005/0025374 | A1* | 2/2005 | Ishikawa | 382/252 |
| 2006/0228035 | A1* | 10/2006 | Ishikawa | 382/252 |
| 2007/0092151 | A1* | 4/2007 | Takahashi et al. | 382/251 |
| 2009/0073495 | A1* | 3/2009 | Ogawa | 358/3.01 |
| 2009/0244632 | A1* | 10/2009 | Yoshimura | 358/3.06 |
| 2009/0262372 | A1 | 10/2009 | Moribe et al. | 358/1.9 |

FOREIGN PATENT DOCUMENTS

JP 2002-374412 A 12/2002

\* cited by examiner

*Primary Examiner* — Li Liu
(74) *Attorney, Agent, or Firm* — Fitzpatrick, Cella, Harper & Scinto

(57) ABSTRACT

The value of a diffusing error for an interest pixel is added to image data of the interest pixel, and is calculated from error data occurred in quantization of pixels adjacent to the interest pixel. The image data, to which the value of the diffusing error is added, is quantized using a quantization threshold. Error data of the interest pixel is calculated from the result of the quantization and the image data to which the value of the diffusing error is added. Pixels which are adjacent to the interest pixel and have quantization results corresponding to the image data of the interest pixel are detected, and information between pixels is calculated based on differences between the image data and quantization results of adjacent pixels which fall within ranges corresponding to the detected adjacent pixels. The quantization threshold for the interest pixel is set based on the information between pixels.

6 Claims, 5 Drawing Sheets

FIG. 8A

|    | 20 | 16 | 14 | 17 | 21 |    |
|----|----|----|----|----|----|----|
| 19 | 11 | 8  | 6  | 9  | 12 | 22 |
| 15 | 7  | 3  | 2  | 4  | 10 | 18 |
| 13 | 5  | 1  | *  |    |    |    |

FIG. 8B

|    |    |    | 17 |    |    |    |
|----|----|----|----|----|----|----|
|    |    | 16 | 10 | 18 |    |    |
|    | 15 | 9  | 5  | 11 | 19 |    |
| 14 | 8  | 4  | 2  | 6  | 12 | 20 |
| 13 | 7  | 3  | 1  | *  |    |    |

APPARATUS AND METHOD FOR QUANTIZING IMAGE DATA

BACKGROUND OF THE INVENTION

1. Field of the Invention

The present invention relates to a process of quantizing tone-level information of an image.

2. Description of the Related Art

Image data having multi-tonal levels (to be referred to as multiple tone-level image data hereinafter) read by an image input apparatus such as a scanner, and multiple tone-level graphic image data created/edited by a computer, are reproduced as images by, for example, a display, a printer, a facsimile machine, or a digital copying machine. At this time, to decrease the amount of image data so as to store and transfer the multiple tone-level image data, a tone-level conversion process for decreasing the number of tonal levels of each pixel is performed. When tone-level conversion is performed in accordance with the tone-level representation capacity per pixel of an image output apparatus such as a printer or an offset printing press, the tone-level conversion process is necessary as well.

Various methods are available for the tone-level conversion process for decreasing the number of tonal levels. For example, an error diffusion method and a minimized average error method that is nearly equivalent to the former method are widely used to attain a satisfactory image quality.

However, the error diffusion method and the minimized average error method pose the following problems.

The first problem is a delay of pixel generation. In other words, generation of black pixels in a density region (to be referred to as a rise region hereinafter) in which the density increases from low densities to middle and high densities delays, and generation of white pixels in a density region (to be referred to as a fall region hereinafter) in which the density decreases from high densities to middle and low densities similarly delays. Note that the delay of pixel generation means that upon examining the pixel values in the order of rasterization, a transition from a low-density region to a middle- and high-density region has already been made in multiple tone-level image data, while that from a low-density region to a middle- and high-density region has not yet been made in corresponding image data having undergone tone-level conversion. Again, the delay of pixel generation similarly means that a transition from a high-density region to a middle- and low-density region has already been made in multiple tone-level image data, while that from a high-density region to a middle- and low-density region has not yet been made in corresponding image data having undergone tone-level conversion.

The second problem is associated with the reproducibility of a fine line. In other words, it is often the case that a fine line has so small a difference in density from the background region that it is reproduced upon being cut off halfway (to be referred to as discontinuation hereinafter) or it is not reproduced at all (to be referred to as disappearance hereinafter).

These problems occur because a diffusing error adversely affects adjacent pixels. In order to solve these problems, Japanese Patent Laid-Open No. 2002-374412 sets a binarization threshold value T in accordance with:

$$T(x,y)=\{I(x,y) \times (K-1)+128\}/K \quad (1)$$

where I(x, y) is the pixel value of an original image at the pixel position (x, y), and K is an arbitrary natural number equal to or more than two.

The above-mentioned method in which the binarization threshold value T(x, y) is uniquely set from the original image data I(x, y) produces a certain effect of preventing pixel generation from delaying, but still cannot achieve a sufficient reproducibility of a fine line, resulting in discontinuation or disappearance.

SUMMARY OF THE INVENTION

In one aspect, a method of quantizing image data, comprising: adding a value of a diffusing error for a pixel of interest to input image data of the pixel of interest, wherein the value of the diffusing error is calculated from error data which are occurred in quantization of pixels adjacent to the pixel of interest; quantizing the image data, to which the value of the diffusing error is added, using a quantization threshold value; calculating error data of the pixel of interest from the result of the quantization and the image data to which the value of the diffusing error is added; detecting pixels which are adjacent to the pixel of interest and have quantization results corresponding to the input image data of the pixel of interest; calculating information between pixels based on differences between input image data and quantization results of adjacent pixels which fall within ranges corresponding to the detected adjacent pixels; and setting the quantization threshold value for the pixel of interest based on the information between pixels.

According to the aspect, it is possible to reduce a delay of pixel generation and improve the reproducibility of a fine line in a tone-level conversion process.

Further features of the present invention will become apparent from the following description of exemplary embodiments with reference to the attached drawings.

BRIEF DESCRIPTION OF THE DRAWINGS

FIGS. 8A and 8B are views showing examples of the coordinate order in which the coordinates (u, v) are updated.

DESCRIPTION OF THE EMBODIMENTS

Image processing in embodiments according to the present invention will be described in detail below with reference to the accompanying drawings. Although an example in which the present invention is applied to an error diffusion method will be given in the following description, the present invention may be applied to a minimized average error method. Also, although the number of tonal levels after tone-level conversion is assumed to be "2" in the following description, it is not particularly limited to "2". In other words, the number of tonal levels after the tone-level conversion is optional. Moreover, although the image scanning direction is assumed to be the x-axis (horizontal) direction for the sake of descriptive simplicity in the following description, it is not particularly limited to this, and may be the y-axis (vertical) direction.

First Embodiment

[Apparatus Configuration]

Figure 1:
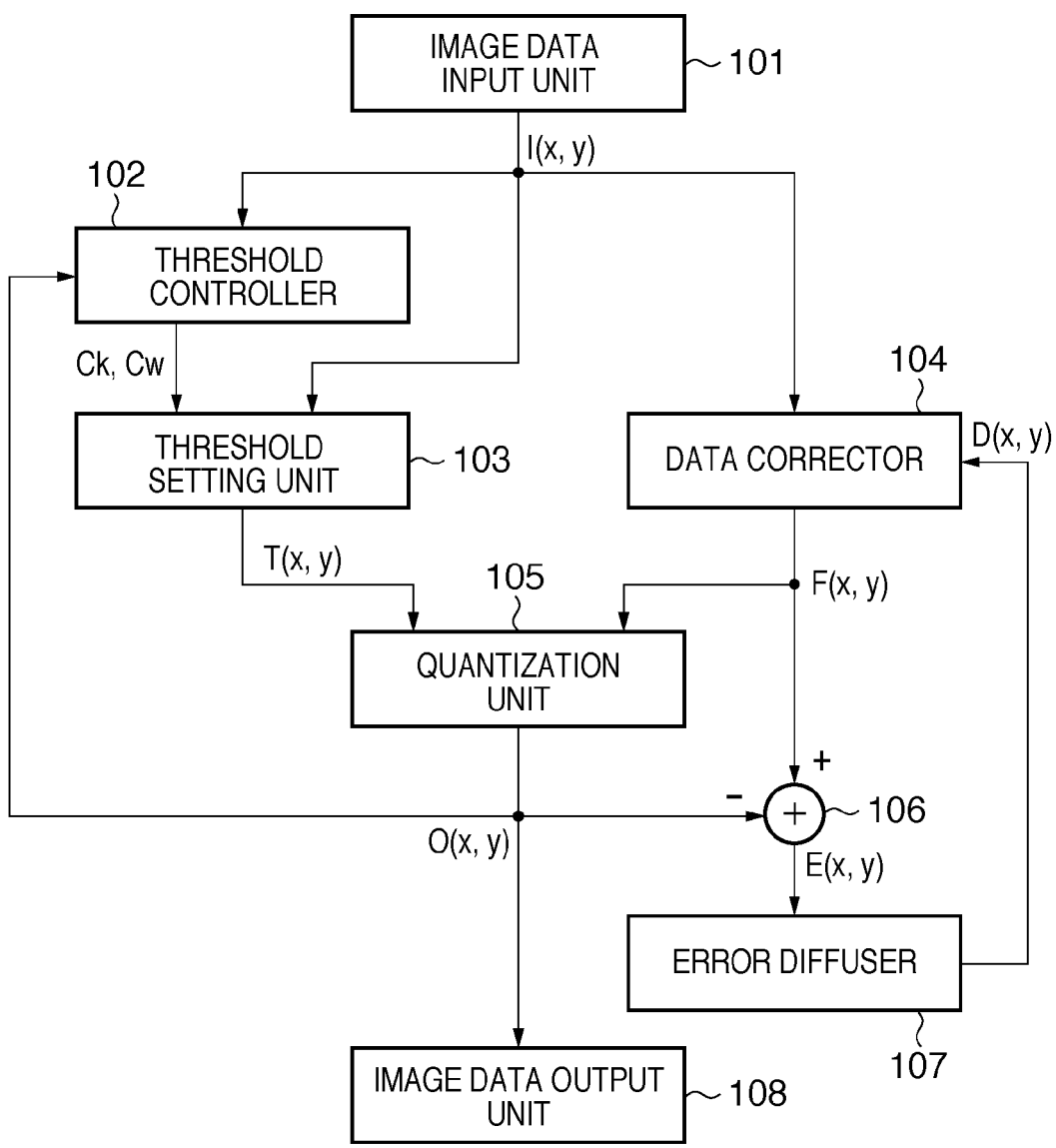
FIG. 1 is a block diagram for explaining the functional configuration of an image processing apparatus according to the first embodiment.

The functional configuration of an image processing apparatus according to the first embodiment will be described with reference to a block diagram shown in FIG. 1.

An image data input unit 101 inputs original image data $I(x, y)$ with m (m is a natural number) tonal levels. Note that $(x, y)$ is the pixel position, and $I(x, y)$ is the normalized density value ($0.0 \leq I(x, y) \leq 1.0$) at the pixel position $(x, y)$. $I(x, y)$ is not limited to the density value, and may be an arbitrary image signal value such as the luminance value and may be a digital value (for example, 0 to 255) in place of a normalized value, as a matter of course.

Based on the original image data (input image data) $I(x, y)$, and pieces of information between pixels Ck and Cw (to be described later), a threshold setting unit 103 sets a binarization threshold value $T(x, y)$ ($0 \leq T \leq 1$) in accordance with:

$$T(x,y)=Tb+N(x,y)-PkCk-PwCw \quad (2)$$

where Tb is the reference threshold value decided from the original image data $I(x, y)$, $N(x, y)$ is the threshold noise value set in accordance with the pixel position $(x, y)$, and Pk and Pw are the parameters which are decided from the original image data $I(x, y)$ and used to control the average distance between dots.

The threshold setting unit 103 sets the binarization threshold value $T(x, y)$ such that black pixels are more likely to be generated as the information between pixels Ck increases, and white pixels are more likely to be generated as the information between pixels Cw increases. Also, the distance between dots is preferably nearly equal to the reciprocal $1/I(x, y)$ of the original image data $I(x, y)$, and details thereof will be described later. Note that the threshold noise value $N(x, y)$ is preferably high-frequency noise. Note that the threshold setting unit 103 sets quantization threshold values instead of the binarization threshold value when image data is quantized to a multiple tone-level greater than a binary level.

A quantization unit 105 outputs output data (output image data) $O(x, y)$ obtained by quantizing corrected data $F(x, y)$ output from a data corrector 104 in accordance with:

if $(F(x, y) > T(x, y))$
$\quad O(x, y) = $ '1';
else
$\quad O(x, y) = $ '0'; ...(3)

An adder 106 calculates the difference (error data) between the image data before and after quantization as a quantization error $E(x, y)$ in accordance with:

$$E(x,y)=F(x,y)-O(x,y) \quad (4)$$

where $F(x, y)=I(x, y)+D(x, y)$, and
$D(x, y)$ is the diffusing error integrated value.

An image data output unit 108 outputs, to, for example, a print apparatus, the output data $O(x, y)$ that is the quantization result output from the quantization unit 105. An inkjet print apparatus forms a dot on, for example, printing paper by discharging ink if $O(x, y)=$'1', and does not form a dot without discharging ink if $O(x, y)=$'0'.

Figure 2:
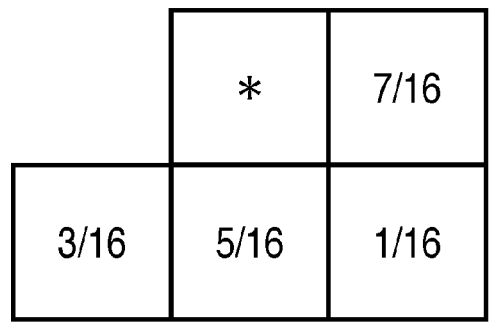
FIG. 2 is a view for explaining an example of an error diffusion matrix.

An error diffuser 107 diffuses the quantization error $E(x, y)$, output from the adder 106, to a plurality of nonquantized pixels among pixels adjacent to the pixel of interest using an error diffusion matrix. The error which diffuses to each pixel position is integrated to calculate the diffusing error integrated value $D(x, y)$. FIG. 2 shows an example of the error diffusion matrix. The quantization error $E(x, y)$ generated upon quantizing the pixel of interest indicated by "*" in FIG. 2 diffuses to pixels adjacent to the pixel of interest shown in FIG. 2 at ratios shown in FIG. 2. When the error diffusion matrix shown in FIG. 2 is adopted, an arbitrary pixel receives the sum of errors which diffuse from four adjacent pixels, except for the pixels on the image edges. The sum of errors received by a given pixel at the pixel position $(x, y)$ is the diffusing error integrated value $D(x, y)$.

The data corrector 104 adds the diffusing error integrated value $D(x, y)$ corresponding to the pixel position $(x, y)$ to the original image data $I(x, y)$ to obtain the corrected data $F(x, y)$.

[Threshold Controller]

A threshold controller 102 calculates the pieces of information between pixels Ck and Cw used to control the degrees of easiness of generation of black and white pixels, respectively, from the original image data $I(x, y)$ and the output data $O(x, y)$.

Figure 7:
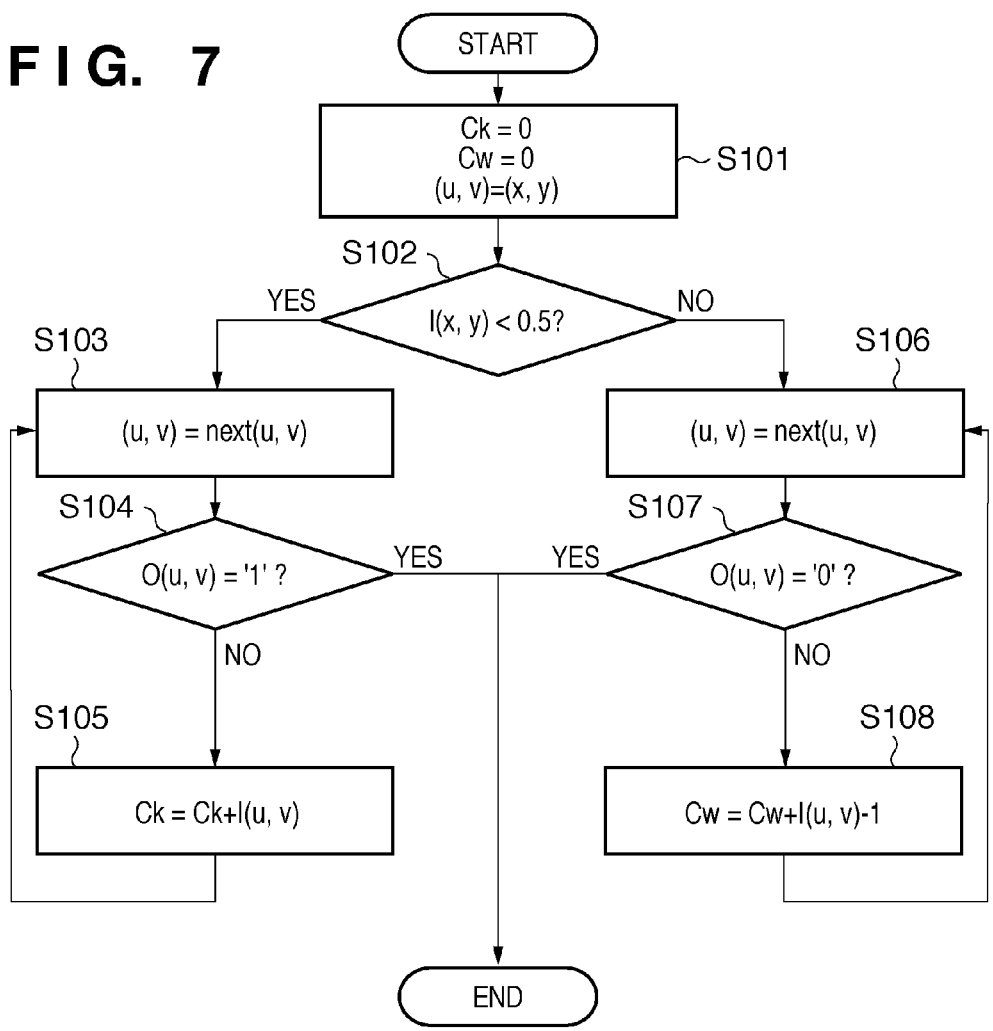
FIG. 7 is a flowchart for explaining a method of calculating pieces of information between pixels Ck and Cw by a threshold controller in the first embodiment.

A method of calculating the pieces of information between pixels Ck and Cw by the threshold controller 102 will be explained with reference to a flowchart shown in FIG. 7. Note that FIG. 7 shows a process per pixel, and the threshold controller 102 performs the process shown in FIG. 7 for each image data (in other words, for each pixel) input to the image data input unit 101.

When a process of quantizing image data at the position of the pixel of interest starts, the threshold controller 102 initializes the pieces of information between pixels (Ck=Cw=0), and initializes the reference pixel coordinates $(u, v)$ ($u=x$, $v=y$) (S101). Note that the initialized reference pixel coordinates $(x, y)$ are the coordinates of the pixel of interest having the input image data I.

The threshold controller 102 inputs the input data $I(x, y)$, determines whether $I(x, y) < 0.5$ (S102), and branches the process into subsequent steps (advances the process to step S103 or S106) in accordance with the determination result. Note that this determination is intended to determine whether the region in which the pixel of interest is present is a highlight region or a shadow region, and the threshold value used in the determination of step S102 may be another value such as 0.4 in place of 0.5. Also, another method such as determination as to whether $O(x-1, y)=$'1' may be adopted.

If $I(x, y) < 0.5$, the threshold controller 102 determines that the region in which the pixel of interest is present is a highlight region, and calculates the information between black pixels Ck. First, the coordinates $(u, v)$ of the pixel to be detected are acquired (S103). The coordinates $(u, v)$ indicate the coordinate position of an adjacent pixel (to be referred to as a reference pixel hereinafter) for which the quantization result to be referred to in the determination of step S104 is obtained. The coordinates $(u, v)$ are updated in accordance with a predetermined referring order. FIGS. 8A and 8B show examples of the referring order. Referring to FIGS. 8A and 8B, "*" indicates the position $(x, y)$ of the pixel of interest. The coordinates $(u, v)$ are updated in descending order of proximity to the position of the pixel of interest. For example, when the referring order shown in FIG. 8A is used and $(u, v)=(x, y)$, the new coordinates $(u, v)$ acquired in step S103 are $(u, v)=(x-1, y)$. Similarly, every time step S103 is executed, the coordinates (u, v) are updated to (u, v)=(x, y−1), (u, v)=(x−1, y), and (u, v)=(x−1, y−1). Note that the referring order can be set arbitrarily, and may be set as shown in, for example, FIG. 8B.

The threshold controller 102 inputs a quantization value (output value) O(u, v) of the reference pixel, and determines whether O(u, v)='1' (black pixel) (S104). In other words, the threshold controller 102 detects a black pixel near the position (x, y) of the pixel of interest. If the determination result obtained in step S104 is true, the threshold controller 102 ends the process. If the coordinates (u, v) reach the upper limit of a predetermined range, for example, the threshold controller 102 has finished the process for all of the reference pixels shown in FIG. 8A or 8B, the threshold controller 102 ends the process as well. On the other hand, if the determination result obtained in step S104 is false, the threshold controller 102 inputs an input value I(u, v) and updates the information between pixels Ck (S105) in accordance with:

$$Ck = Ck + I(u,v) \quad (5)$$

The data of a pixel for which the determination result obtained in step S104 is false (O(u, v)='0') is output as that of a white pixel, and the error (difference) between the input data and the output data becomes I(x, y)−0=I(u, v) (the value 0 is the output data of a white pixel).

After that, the threshold controller 102 returns the process to step S103, in which it acquires the coordinates (u, v) and updates the information between pixels Ck.

In this manner, when the pixel of interest falls within a highlight region, a black pixel near the pixel of interest is detected as the information between pixels Ck, and the integrated value of the input data of adjacent pixels which fall within a range corresponding to the detected black pixel is obtained. This means obtaining the local black density within the range corresponding to the detected black pixel in the input image.

The threshold controller 102 acquires the coordinates (u, v) of a reference pixel if I(x, y)≧0.5 as well (S106). This process may be the same as in step S103. If I(x, y)≧0.5, the threshold controller 102 determines that the region in which the pixel of interest is present is a shadow region, and calculates the information between white pixels Cw.

The threshold controller 102 acquires the coordinates (u, v) in the image (S106), inputs an output value O(u, v), and determines whether O(u, v)='0' (S107). In other words, the threshold controller 102 detects a white pixel near the position (x, y) of the pixel of interest. If the determination result obtained in step S107 is true, the threshold controller 102 ends the process. If the coordinates (u, v) reach the upper limit of the predetermined range, the threshold controller 102 ends the process as well. On the other hand, if the determination result obtained in step S107 is false, the threshold controller 102 inputs an input value I(u, v) and updates the information between pixels Cw (S108) in accordance with:

$$Cw = Cw + I(u,v) - 1 \quad (6)$$

The data of a pixel for which the determination result obtained in step S108 is false (O(u, v)='1') is output as that of a black pixel, and the error (difference) between the input data and the output data becomes I(x, y)−1 (the value 1 is the output data of a black pixel).

After that, the threshold controller 102 returns the process to step S106, in which it acquires the coordinates (u, v) and updates the information between pixels Cw.

In this manner, when the pixel of interest falls within a shadow region, a white pixel near the pixel of interest is detected as the information between pixels Cw, and the integrated value of errors between the input data and output data of adjacent pixels which fall within a range corresponding to the detected white pixel is obtained. This means obtaining the local white density within the range corresponding to the detected white pixel in the input image.

In other words, the threshold controller 102 and threshold setting unit 103 detect pixels which are adjacent to the pixel of interest and have quantization results corresponding to the input image data of the pixel of interest. The sum of error data between the input image data and quantization results of adjacent pixels which fall within ranges corresponding to the detected adjacent pixels is obtained to set a quantization threshold value for the pixel of interest in accordance with the obtained sum.

With the foregoing process, the threshold value T(x, y) decreases as black dots become more insufficient in the vicinity of the pixel of interest, and increases as white dots become more insufficient in the vicinity of this pixel. That is, black dots are more likely to be formed when black dots are insufficient, and white dots are more likely to be formed when white dots are insufficient. This makes it possible to satisfactorily reproduce a fine line while maintaining an appropriate dot interval.

Second Embodiment

Image processing in the second embodiment according to the present invention will be described below. Note that the same reference numerals as in the first embodiment denote the same configurations in the second embodiment, and a detailed description thereof will not be given.

In the first embodiment, it is necessary to hold the input value I(u, v) and the output value O(u, v) at the position (u, v) of an adjacent pixel. In other words, it is necessary to provide a memory used to hold the state of the processed pixel. A configuration which reduces the memory size used to hold the state of the processed pixel by limiting the search range to that in the horizontal direction will be described in the second embodiment. A difference from the first embodiment lies in the arrangement of a threshold controller 102.

Figure 3:
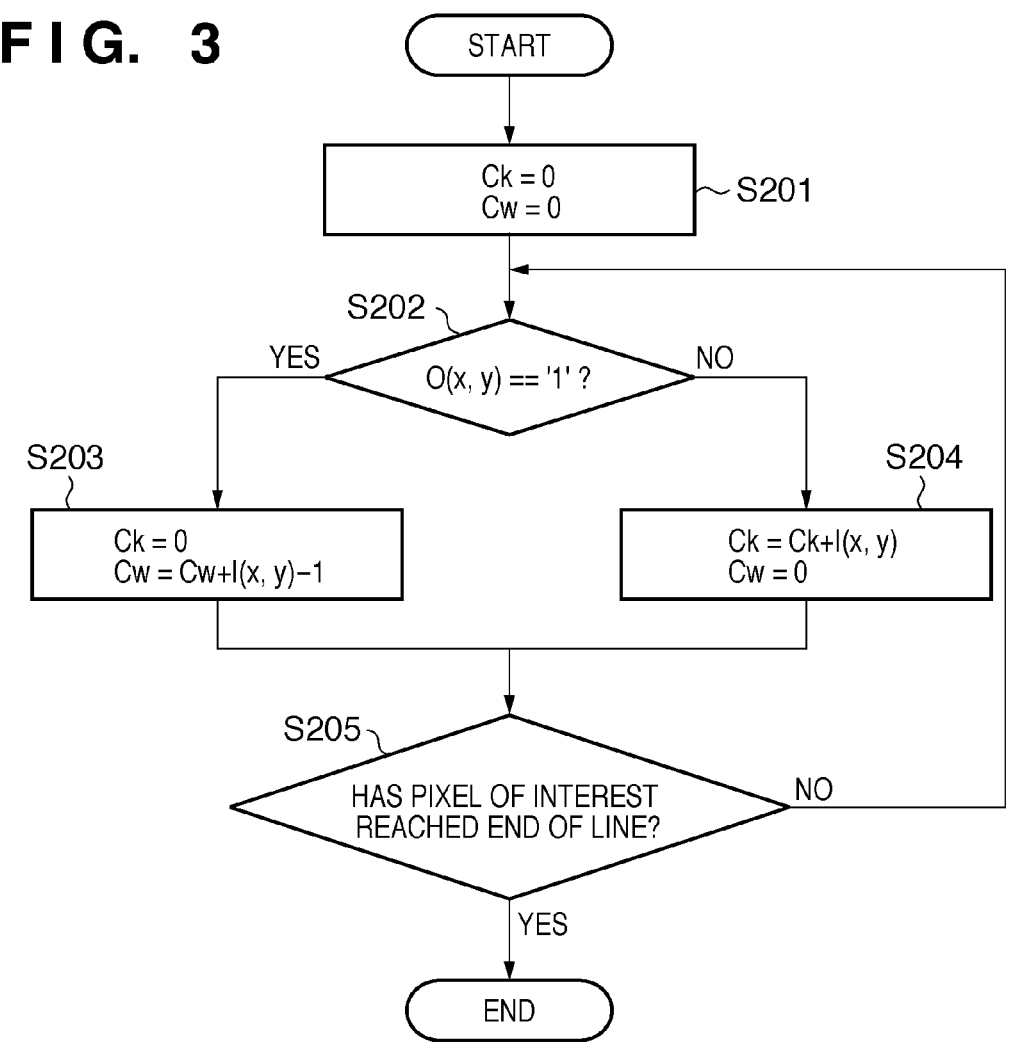
FIG. 3 is a flowchart for explaining a method of calculating pieces of information between pixels Ck and Cw by a threshold controller in the second embodiment.

A method of calculating pieces of information between pixels Ck and Cw by the threshold controller 102 will be explained with reference to a flowchart shown in FIG. 3. Note that FIG. 3 shows a process per scanning line, and the threshold controller 102 repeats the process shown in FIG. 3 by the number of lines in an image to undergo tone-level conversion.

When a process of quantizing image data on a given line starts, the threshold controller 102 initializes the pieces of information between pixels (Ck=Cw=0) (S201). Also, the threshold controller 102 calculates the pieces of information between pixels Ck and Cw used to control the degrees of easiness of generation of black and white pixels, respectively, from original image data I(x, y) and output data O(x, y).

The threshold controller 102 inputs the output data O(x, y), determines whether O(x, y)='1' (S202), and updates the pieces of information between pixels Ck and Cw (S203 or S204) by a computation corresponding to the determination result:

```
if (O(x, y) == '1'){
    Ck = 0;
    Cw = Cw + I(x, y) − O(x, y) = Cw + I(x, y) − 1;
} else {
    Ck = Ck + I(x, y) − O(x, y) = Ck + I(x, y);
    Cw = 0;
}                                                    ...(7)
```

The threshold controller 102 determines whether the pixel of interest has reached the pixel at the end of the line (for example, the right edge of the image) (S205). If NO in step S205, the threshold controller 102 returns the process to step S202; otherwise, it ends the process for one line.

Expression (7) presents a method in which the pieces of information between pixels Ck and Cw are calculated and which corresponds to an error diffusion method when the output has a binary value. When the method of calculating the pieces of information between pixels Ck and Cw is generalized to an error diffusion method which uses a value n (n<m; n is a natural number), n variables $C_i$ ($1 \leq i \leq n$) are calculated in accordance with:

$$\begin{aligned}&\text{if } (O(x, y) == i/n)\{\\&\quad C_i = 0;\\&\quad C_{i+1} = C_{i+1} + I(x, y) - O(x, y);\\&\quad C_{i-1} = C_{i-1} + I(x, y) - O(x, y);\\&\}\end{aligned} \quad \ldots(8)$$

As is apparent from expressions (7) and (8), the pieces of information between pixels Ck and Cw calculated by the threshold controller 102 depend on the sum of the differences between the original image data and output data of pixels quantized ahead of the pixel of interest to be quantized. In other words, the pieces of information between pixels Ck and Cw depend on the number of quantized pixels, but is not the simple product (the distance between pixels)×(the number of pixels). However, the pieces of information between pixels Ck and Cw may be calculated in accordance with:

$$\begin{aligned}&\text{if } (O(x, y) == \text{'}1\text{'})\{\\&\quad Ck = 0;\\&\quad Cw = Cw + 1;\\&\} \text{ else } \{\\&\quad Ck = Ck + 1;\\&\quad Cw = 0;\\&\}\end{aligned} \quad \ldots(9)$$

The pieces of information between pixels Ck and Cw obtained by expression (9) depend on the number of pixels quantized ahead of the pixel of interest to be quantized, and are therefore easy to intuitively be understood as pieces of information between pixels.

The inventor of the present invention verified by experiment that the quality of an image reproduced by the output data O(x, y) which uses the pieces of information between pixels obtained by expression (9) is poorer than that of an image reproduced by the output data O(x, y) which uses the pieces of information between pixels obtained by expression (7). The inventor examined the causes of this phenomenon and surmises that first, the appropriate distance between dots 1/I as the reciprocal of the arbitrary input pixel value I ($0.0 \leq I \leq 1.0$) generally does not become an integer. The inventor also surmises that second, a situation in which the input pixel value I(x, y) changes in accordance with the pixel position is not taken into consideration. As an example of means for solving these problems, a value corresponding to an appropriate distance between dots, as presented in expression (7), is preferably used. In other words, it is important that "the information between pixels" in this embodiment has a value indicating an appropriate distance between dots, and is not limited to the simple distance between pixels (the number of pixels).

[Reproducibility of Fine Line]

Figures 4A, 4B, 4C:
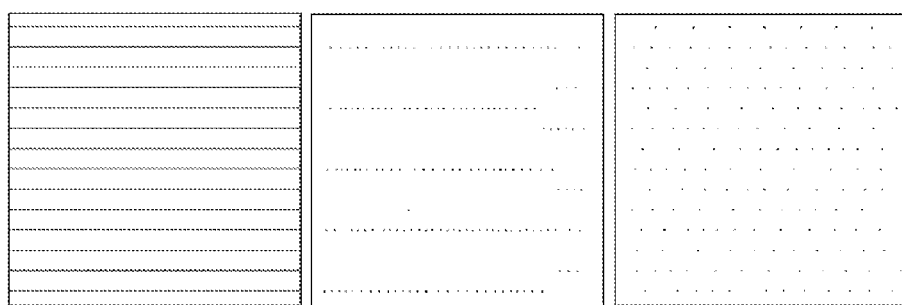
FIGS. 4A to 4C are views for explaining the processing results obtained in the first and second embodiments.

The processing results obtained in the first and second embodiments will be described with reference to FIGS. 4A to 4C. FIG. 4A shows an image in which a plurality of fine lines is aligned in the y-axis direction to extend in the x-axis direction. FIG. 4B shows the result of quantizing the image shown in FIG. 4A by the conventional error diffusion method. FIG. 4C shows the result of quantizing the image shown in FIG. 4A by the error diffusion methods in the first and second embodiments. As can be seen from a comparison between FIGS. 4B and 4C, the error diffusion methods in the first and second embodiments reproduce more satisfactorily fine lines. In other words, a delay of pixel generation in a tone-level conversion process can be reduced and the reproducibility of a fine line in this process can be improved by changing the quantization threshold value based on the pieces of information between pixels.

[Method of Setting Parameters Pk and Pw]

Although a method of setting parameters Pk and Pw will be exemplified hereinafter, it is not particularly limited to the following method.

The parameter Pk which defines the distance between black dots will be described first. Let n be the distance between dots when black pixels are generated for x=0 and x=n and are not generated for x=1 to n−1. The value of the parameter Pk, at which the distance between dots n becomes 1/I(x, y), is derived.

First, two assumptions are set for the sake of simplicity in model. The first assumption is that the input pixel value I(x, y) is a constant value I within the range of $0 \leq x \leq n$. The second assumption is that the influence of errors which diffuse in directions other than the scanning direction is negligibly small. This assumption amounts to regarding the errors received from pixels on one line as being sufficiently small when the scanning direction is assumed to be the x-axis direction. Note that these assumptions are equivalent to targeting an image in which one horizontal line with a width of one pixel is drawn against the white background, and the inventor of the present invention verified by experiment that the parameter derived from this model is also effective in a variety of images.

Letting a ($0.0 \leq a < 1.0$) be the error diffusion coefficient in the x-axis direction, corrected data F(n, y) is obtained in accordance with a recursion formula:

$$\begin{aligned}F(n, y) &= I + aF(n-1, y) \\&= I + a\{I + aF(n-2, y)\} \\&= I + aI + a^2 I + a^3 I + \ldots + a^{n-1} I + a^n \{F(0, y) - 1\} \\&= \{(1 - a^n)/(1 - a)\}I + a^n \{F(0, y) - 1\}\end{aligned} \quad (10)$$

When a black pixel is generated, the corrected data and the threshold value are expected to have values close to each other, so approximation $F(0, y) \approx T(0, y) \approx T(n, y)$ holds. Upon substituting T(n, y) for F(0, y) in recursion formula (10), a black pixel is generated when n satisfies an inequality:

$$\{(1-a^n)/(1-a)\}I + a^n\{T(n,y)-1\} \geq T(n,y) \quad (11)$$

From $1-a^n > 0$, inequality (11) can be rewritten as:

$$I/(1-a) - a^n/(1-a^n) \geq T(n,y) \quad (12)$$

On the other hand, if $1 \leq x \leq (n-1)$, no black pixel is generated, so Ck=(n−1)I and Cw=0. Then, T(n, y) is given by:

$$T(n,y) = Tb + N(n,y) - Pk(n-1)I \quad (13)$$

From inequality (12) and equation (13), we have an inequality:

$$I/(1-a) - a^n/(1-a^n) \geq Tb + N(n,y) - Pk(n-1)I \quad (14)$$

When the parameter Pk is decided such that the minimum natural number n which satisfies inequality (14) becomes equal to 1/I, the average of the distance between dots can be set to 1/I. That is, an inequality in which 1/I is substituted for n as:

$$I/(1-a)-a^{1/I}/(1-a^{1/I}) \geq Tb+N(n,y)-Pk\{(1/I)-1\}I \quad (15)$$

need only be satisfied.

Inequality (15) can be rewritten as a function describing the parameter Pk:

$$Pk=1/(I-1)\{I/(1-a)-a^{1/I}/(1-a^{1/I})-Tb-N(n,y)\} \quad (16)$$

From equation (16), a suitable value of the parameter Pk can be obtained. However, note that I≠1.0. Also, for a tonal level which does not require correction, Pk<0 but Pk=0 is set in practice. Note that to take account of a variation in noise, it is desirable to calculate the expected value of n when the noise stochastically varies.

The parameter Pw can also be set to a suitable value by the same principle as above.

Figure 5:
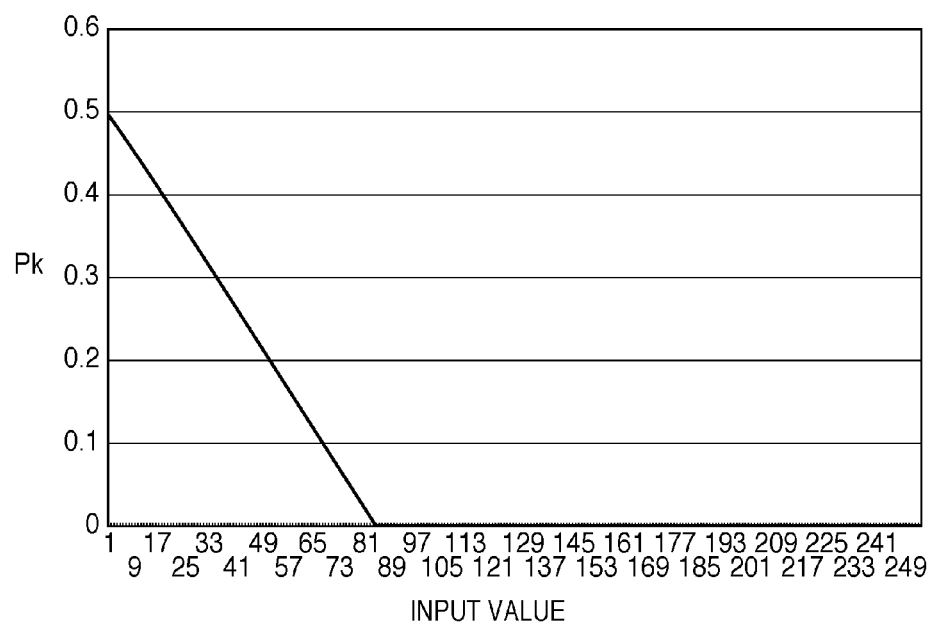
FIG. 5 is a graph showing an example of a parameter Pk.

FIG. 5 is a graph showing an example of the parameter Pk. This graph shows the input value I on the abscissa, and the parameter Pk on the ordinate. The graph shown in FIG. 5 gives an example in which the reference threshold value Tb is set to a constant of 0.5 (127 when the image data has tonal levels of 0 to 255) regardless of the input value I, and the error diffusion coefficient a is set to 7/16 regardless of the input value I as well, and the threshold noise value N is set to zero.

Modification of Embodiments

Although the parameters Pk and Pw are uniquely decided from the value of the original image data I(x, y) in the above-described embodiments, they may be constants. Also, although the addition of the threshold noise value N is preferable, it is not indispensable. Moreover, instead of directly adding the threshold noise value to the threshold value, as presented in equation (2), the noise may be added in calculating the pieces of information between pixels presented in expression (7). The error diffusion coefficient and the scanning direction can also be set arbitrarily, as a matter of course.

In other words, the present invention is characterized in that pieces of information between pixels are acquired and controlled so as to reproduce an image with an appropriate density, and the method of acquiring and controlling the pieces of information between pixels is not particularly limited. The present invention is also applicable to tone-level conversion methods typified by a wide variety of proposed error diffusion methods.

Figure 6:
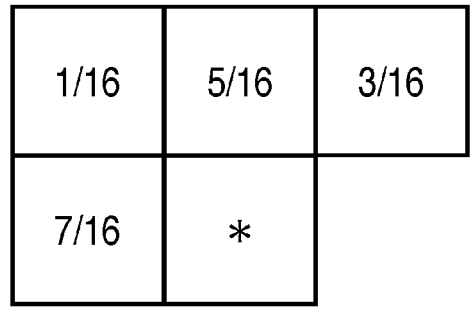
FIG. 6 is a view showing an example of a weighting factor to be applied to a quantization error of an adjacent pixel used to calculate the average error.

When, for example, the present invention is applied to a minimized average error method in place of an error diffusion method, a quantization error E(x, y) in each pixel is held, and D(x, y) is calculated as the average error in the vicinity of the pixel of interest by an error diffuser 107. FIG. 6 shows an example of a weighting factor to be applied to the quantization error E(x, y) in an adjacent pixel, which is used to calculate the average error D(x, y). The minimized average error method and the error diffusion method require different memory sizes because of a difference in calculation procedure, but realize equivalent processes, so the present invention is also applicable to the former method.

Although ink has been exemplified as a coloring material by taking a printer as an example in the above-described embodiments, the present invention is not limited to this, and toner may be used as a coloring material by taking an electrophotographic printer or copying machine as an example. In other words, an electrophotographic print apparatus, for example, forms a dot using toner if O(x, y)='1' to transfer the formed dot onto, for example, printing paper. However, if O(x, y)='0', this apparatus does not form a dot using toner. Also, the output destination of the output data O(x, y) is not limited to a print apparatus, and this data may be output to an image display apparatus or a memory.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001571, filed Jan. 6, 2010, which is hereby incorporated by reference herein in its entirety.

What is claimed is:

1. An image processing apparatus for quantizing image data, comprising:
a corrector, configured to add a value of a diffusing error for a pixel of interest to input image data of the pixel of interest, wherein the value of the diffusing error is calculated from error data which are occurred in quantization of pixels adjacent to the pixel of interest;
a quantization section, configured to quantize the image data, to which the value of the diffusing error is added, using a quantization threshold value;
a calculator, configured to calculate error data of the pixel of interest from the result of the quantization and the image data to which the value of the diffusing error is added;
a detector, configured to detect pixels which are adjacent to the pixel of interest and have quantization results corresponding to the input image data of the pixel of interest; and
a setting section, configured to calculate information between pixels based on differences between input image data and quantization results of adjacent pixels which fall within ranges corresponding to the detected adjacent pixels, and to set the quantization threshold value for the pixel of interest based on the information between pixels.

2. The apparatus according to claim 1, wherein said detector determines whether a region in which the pixel of interest is present is a shadow region or a highlight region, and
wherein said detector detects adjacent pixels having quantization results indicating white pixels if it is determined that the pixel of interest falls within the shadow region, and detects adjacent pixels having quantization results indicating black pixels if it is determined that the pixel of interest falls within the highlight region.

3. The apparatus according to claim 1, wherein said setting section sets the quantization threshold value so as to obtain a distance between dots, which is nearly equal to a reciprocal of the input image data.

4. The apparatus according to claim 1, wherein said setting section sets the quantization threshold value for use in one of an error diffusion method and a minimized average error method.

5. A method of quantizing image data, comprising:
using a processor to perform the steps of:
adding a value of a diffusing error for a pixel of interest to input image data of the pixel of interest, wherein the value of the diffusing error is calculated from error data which are occurred in quantization of pixels adjacent to the pixel of interest;
quantizing the image data, to which the value of the diffusing error is added, using a quantization threshold value;
calculating error data of the pixel of interest from the result of the quantization and the image data to which the value of the diffusing error is added;
detecting pixels which are adjacent to the pixel of interest and have quantization results corresponding to the input image data of the pixel of interest;
calculating information between pixels based on differences between input image data and quantization results of adjacent pixels which fall within ranges corresponding to the detected adjacent pixels; and
setting the quantization threshold value for the pixel of interest based on the information between pixels.

6. A not-transitory computer readable medium storing a program for causing a computer to perform a method of quantizing image data, the method comprising the steps of:
adding a value of a diffusing error for a pixel of interest to input image data of the pixel of interest, wherein the value of the diffusing error is calculated from error data which are occurred in quantization of pixels adjacent to the pixel of interest;
quantizing the image data, to which the value of the diffusing error is added, using a quantization threshold value;
calculating error data of the pixel of interest from the result of the quantization and the image data to which the value of the diffusing error is added;
detecting pixels which are adjacent to the pixel of interest and have quantization results corresponding to the input image data of the pixel of interest;
calculating information between pixels based on differences between input image data and quantization results of adjacent pixels which fall within ranges corresponding to the detected adjacent pixels; and
setting the quantization threshold value for the pixel of interest based on the information between pixels.

* * * * *